United States Patent [19]

Lindemann

[11] 4,110,289

[45] Aug. 29, 1978

[54] THERMOSETTING VINYL ESTER EMULSION COPOLYMERS

[75] Inventor: Martin K. Lindemann, Greenville, S.C.

[73] Assignee: Chas. S. Tanner Co., Greenville, S.C.

[21] Appl. No.: 701,171

[22] Filed: Jun. 30, 1976

Related U.S. Application Data

[63] Continuation of Ser. No. 340,535, Mar. 12, 1973, which is a continuation-in-part of Ser. No. 142,406, May 11, 1971.

[51] Int. Cl.$^2$ ............................................. C08L 31/04
[52] U.S. Cl. ..................... 260/29.6 TA; 260/29.4 UA; 260/29.6 H
[58] Field of Search ............... 260/29.4 UA, 29.6 RB, 260/29.6 MN, 29.6 NR, 29.6 T, 29.6 TA, 851, 29.6 WB, 29.6 RW, 29.6 H

[56] References Cited

U.S. PATENT DOCUMENTS 3,941,735  3/1976  Lindemann ................. 260/29.6 TA

FOREIGN PATENT DOCUMENTS 610,432  12/1960  Canada ........................... 260/29.4 UA Primary Examiner—Lorenzo B. Hayes
Attorney, Agent, or Firm—Dressler, Goldsmith, Clement, Gordon & Shore

[57] ABSTRACT

Vinyl ester emulsion copolymers are modified to introduce improved thermosetting cure capacity by including in the copolymer a proportion of a formaldehyde addition product with an allyl carbamate. These emulsions are useful as binders for fibers in non-woven fabrics where the improved cure confers superior resistance to home laundering in aqueous detergent solutions.

7 Claims, No Drawings

THERMOSETTING VINYL ESTER EMULSION COPOLYMERS

This is a continuation, of application Ser. No. 340,535, filed 3/12/73 which is a continuation-in-part of my prior application Ser. No. 142,406, filed May 11, 1971.

The present invention relates to emulsion copolymers of vinyl esters, such as vinyl acetate, which have been modified to introduce improved thermosetting cure capacity. These emulsion copolymers are known to be useful as binders for nonwoven fabrics, but they exhibit inadequate resistance to home laundering in aqueous detergent solutions. This invention has, as its main objective, the achievement of improved cure characteristics, which can be demonstrated by the achievement of increased insolubilization after cure.

In connection with the thermosetting characteristics which it is desired to achieve in accordance with the invention, the increased insolubilization which is achieved leads to many important benefits. With particular reference to fabrics which have been treated with the emulsions of the invention and then baked in order to cure the deposited copolymer, wash resistance and nonwoven web integrity are improved when the emulsion is used as a binder for a nonwoven web.

It is stressed that the capacity to resist ordinary home laundering is a severe test for an emulsion copolymer containing a large proportion of vinyl ester, particularly vinyl acetate, and maximized insolubility is critically needed to obtain the desired result. Even a small increase in insolubility can, and has, converted inadequate materials into satisfactory ones.

In accordance with the invention, the vinyl acetate emulsion copolymer is modified by the copolymerization therein of a formaldehyde adduct with an allyl carbamate. These allyl carbamates have the formula:

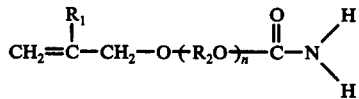

in which $R_1$ is hydrogen or methyl, $R_2$ is an alkylidene group containing from 2–4 carbon atoms, and n is an integer from 0–10, preferably from 0–2.

Various allyl carbamates are useful herein, especially allyl carbamate and methallyl carbamate.

Allyl carbamate has the formula:

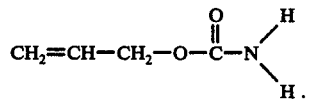

This monoethylenic monomer is not an amide and it will react with formaldehyde in an addition reaction with the two amino hydrogen atoms to generate the N-methylol group. When one molar proportion of formaldehyde is taken up, the derivative can be described by the formula:

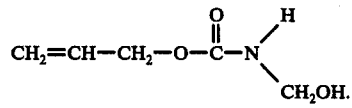

The same reaction can proceed to take up more formaldehyde to increase the functionality which is generated.

Regardless of whether one or two moles of formaldehyde are reacted into the molecule, the monomer is an allyl ester and this is most important in the copolymerization with vinyl acetate, or other vinyl ester such as vinyl butyrate, since the monomer reactivity ratio of the allylic unsaturation of the allyl ester with vinyl acetate is close to 1:1. In contrast, methylol acrylamide enters the vinyl ester copolymer much more rapidly than the vinyl ester and is consumed long before the vinyl acetate is polymerized, forcing a considerable portion of the polymer to lack the reactive group which is the basis for subsequent insolubilization. As a result, a significant increase in insolubility is obtained, as documented hereinafter, and the improvement, while numerically small, has converted fiber binders which were unacceptable because nonwoven fabrics containing the same were disrupted by home laundering, into satisfactory wash-resistant binders.

As previously indicated, the allyl carbamate may include ether groups between the allyl group and the carbamate group. These ethers can be provided by reacting the allyl alcohol with an alkylene oxide, such as ethylene oxide, before converting the resulting alcohol to the carbamate as will be illustrated hereinafter.

The adduction of the carbamate with formaldehyde is well known and conventional and yields N-methylol derivatives. These are a mixture of the mono-N-methylol adduct, the di-N-methylol adduct and unreacted carbamate which, if present, is not harmful.

The N-methylol groups may be left unreacted, or they may be etherified with a $C_1$-$C_8$ alcohol, preferably a $C_1$-$C_4$ alcohol. The alcohol is released on baking to regenerate the N-methylol group for cure, as is well known. Accordingly, ethers of the allyl carbamates are included herein. Preferred alcohols are methyl alcohol and ethyl alcohol. Isopropyl alcohol and isobutyl alcohol are also highly effective. 2-ethoxy ethanol and 2-butoxy ethanol are also useful.

While vinyl acetate is the preferred vinyl ester, all of the vinyl esters with saturated aliphatic monocarboxylic acids are useful in this invention, vinyl stearate or vinyl versatate further illustrating the class under consideration.

The vinyl ester is intended to constitute the bulk of the emulsion copolymer, e.g., at least 85% by weight, preferably at least 90%, with the allyl carbamate-formaldehyde adduct providing the essential thermosetting cure, other monoethylenic monomers copolymerizable with the vinyl ester may be present in small amount, especially those which are reactive with the N-methylol group.

Particularly desirable monomers for inclusion in small amount in the copolymer are acrylamide, methacrylamide, or other monoethylenic unsaturated amide as well as monoethylenic alcohols such as allyl alcohol, 2-hydroxy ethyl acrylate- or methacrylate, or the like.

The presence of a small proportion of an amide or alcohol as noted above is particularly desirable since it significantly improves the cure with the N-methylol functionality of the allyl carbamate-formaldehyde adduct.

Another monomer which may optionally be present in small amount and which is helpful to enhance the cure is a small proportion of monoethylenic acid such as maleic, acrylic, or methacrylic acids or, more preferably, crotonic acid, 0.5–3% being typical. Monoethylenic sulphonic acids, or their salts, such as 2-sulphoethyl methacrylate or sodium vinyl sulphonate are also useful.

The monomers providing thermosetting characteristics may be used in an amount of from 0.5–15%, but are preferably used in an amount of from 2 to 10%. As previously indicated, the formaldehyde addition product with allyl carbamate will constitute the bulk of the monomers providing thermosetting characteristics, but a monoethylenic amide or alcohol, either alone or together with a monoethylenic carboxylic acid is preferably included in minor proportion with respect to the total monomers providing the thermosetting cure. From 0.5–7% of the N-methylol allyl carbamate or its ether is preferred to provide the desired insolubilization. Other monomers which may be present in small amount are illustrated by acrylonitrile or vinyl chloride.

It is also possible to include up to about 1% of a polyethylenic monomer as a chain extender, such as diallyl maleate or triallyl cyanurate or butylene glycol diacrylate, though this is not normally required herein because of the excellent copolymerization and distribution within the copolymer which is obtained using the allyl carbamates disclosed herein.

Since the aqueous emulsion polymerization of vinyl acetate is well known per se, it will not be described at length. Auxiliary agents may also be present, as is known, such as protective colloids illustrated by polyvinyl alcohol and hydroxyethyl cellulose.

From the standpoint of cure, baking is normally carried out at temperatures of from 250°–500° F. for periods of from 30 seconds to 1 hour, but more usually at 275°–350° F. for from 2–20 minutes.

The proportions referred to herein and throughout this specification are by weight unless otherwise specified.

The invention is illustrated in the examples which follow.

EXAMPLE 1

A monomer emulsion was made up by mixing the following ingredients in the order stated:

| Monomer Emulsion | Parts | |
|---|---|---|
| (Only 90% of the Emulsion is Charged) | | |
| Vinyl acetate | 1650 | grams |
| N-methylol allyl carbamate (16.9% in water) | 245 | grams |
| Acrylamide (21% in water) | 261.5 | grams |
| Nonyl phenol polyethylene glycol ether containing 9 moles ethylene oxide (Tergitol TP-9 may be used) | 33 | grams |
| Nonyl Phenol with 40 moles of ethylene oxide per mole of phenol in a 70% aqueous solution (Tergitol 3477 may be used) | 47.3 | grams |

A reaction flask equipped with stirrer, reflux condenser and thermometer was charged with:

| Charge | Parts | |
|---|---|---|
| Water | 1030 | grams |
| Nonyl phenol polyethylene glycol ether containing 9 moles ethylene oxide | 16.6 | grams |
| Nonyl phenol with 40 moles of ethylene oxide per mole of phenol in a 70% aqueous solution | 24 | grams |
| Sodium persulfate | 11 | grams |
| Fe So$_4$ | 2 | grains |
| Above Monomer Emulsion | 220 | grams |

The pH was adjusted to 4 with acetic acid. After heating the reaction mixture to 38° C., 5 cc of a 6% water solution of sodium formaldehyde sulfoxylate were added which raised the kettle temperature to 46° C. The remaining monomer emulsion (to 90% of the total amount prepared) was added incrementally over a period of 4 hours during which time ammonia was added periodically to maintain the pH in the range of 2.5–3.5 and the 6% sulfoxylate solution was also added periodically (a total of 32 cc) to maintain the reaction temperature at 52°–54° C. At this point, the free monomer content was 0.33%. The resulting latex was neutralized with ammonia to pH 4.5 and cooled. 500 grams of water were then added to provide a solids content of 45.3%. The product had the following additional properties:

| | |
|---|---|
| Viscosity (#1 Spindle, 60 rpm, Brookfield) | 68 centipoises |
| Intrinsic viscosity in deciliters/gram (see note 1 for measurement details) | 1.71 |
| Insolubles after curing 45 minutes at 110° C. (see note 2 for extraction details) | 89.5% Insolubles in Chloroform |
| Average particle size | 0.5 micron |

Note 1 - In measuring viscosity, a sample of the polymer emulsion (0.5 cc) is added to 100 cc. of reagent grade dimethyl formamide and the mixture agitated for 20 minutes and filtered. The flow time of the solution so-prepared is then compared with the flow time of the pure solvent using a Ubbelohde Viscosimeter (Cannon-Fenske) at 30° C. The relative viscosity is the fraction obtained by dividing the flow time of the solution by the flow time of the pure solvent. The Huggin's equation is then used to calculate the intrinsic viscosity from the relative viscosity measurement and from the resin solids content in grams per 100 ml. of emulsion.

Note 2 - A specimen is baked at the given temperature for the time listed and then extracted with the named solvent. The percent insoluble value is obtained by pouring 25 ml. of the polymer emulsion on a glass plate, and allowing it to dry overnight at room temperature. Water is then removed by 24 hours storage in a desiccator. The dry film is then scraped off the glass plate and 4 grams thereof are placed in a Soxhlet thimble. Extraction is then carried out with 350 ml. of the named solvent at boiling for 48 hours. The solvent is then evaporated and the residue is dried overnight at 95° C. in a forced air oven. The weight of the polymer sample after extraction is compared with the weight of the sample before extraction to provide the percent insoluble value.

EXAMPLE 2

The N-methylol allyl carbamate used in the previous example is prepared as follows.

44 grams of allyl carbamate (0.5 mol) was added to 300 grams of water. The pH was adjusted to 11.5 with approximately 3 cc. of a 50% sodium hydroxide solution after which 16.5 grams of paraformaldehyde were added. The mixture was heated to 75° C. and kept for three hours. An additional 6 cc. of a 50% sodium hydroxide solution was added incrementally to maintain the pH at 11. The formaldehyde content was determined to be 0.4% after three hours reaction. The pH was then adjusted to 5 with sulfuric acid to provide the N-methylol derivative.

EXAMPLE 3

Example 1 was repeated, and then repeated again while replacing the aqueous solution of N-methylol allyl carbamate with a corresponding aqueous solution of N-methylol acrylamide in the same concentration. The replacement was on a molar basis so that the same number of N-methylol functional groups is introduced into the copolymer, and the various runs were made side-by-side to insure comparability. The various copolymers so-produced were tested to determine how completely they were insolubilized using the procedure set forth in Note 2, hereinbefore, and employing a bake schedule of 10 minutes at 150° C. with 1,1,1-trichloroethylene as the extracting solvent.

The repeat of Example 1 in which vinyl acetate is the only non-reactive monomer shows that replacement of the N-methylol allyl carbamate with N-methylol acrylamide reduces the insolubility of the copolymer from 96.7% to 88.3%. This difference is significant since the N-methylol acrylamide copolymer used as a binder for fibers in a nonwoven fabric lacked laundry resistance, whereas the N-methylol allyl carbamate copolymer was markedly superior in this respect.

EXAMPLE 4

The aqueous emulsion of Example 1 is diluted with water to 25% solids and then applied to a nonwoven batt by spraying first from one side, and then from the other. The sprayed batt is dried and cured by passing it through an oven using a bake schedule of 10 minutes at 150° C. to cure the resin and thereby bind the fibers of the batt to one another. It is found that the capacity of the binder to withstand home laundering is markedly improved in comparison with the use in the copolymer of a corresponding proportion of N-methylol acrylamide.

The invention may be used to bind the fibers of a nonwoven fabric regardless of whether the fabric is of low or high loft.

The invention is defined in the claims which follow.

I claim:

1. An aqueous emulsion comprising an aqueous medium having colloidally suspended therein by means of a surfactant an aqueous emulsion copolymer consisting essentially of at least 85% of the copolymer of vinyl ester with a saturated aliphatic monocarboxylic acid containing up to 18 carbon atoms, and from 0.5–15% of the copolymer of monomers providing thermosetting characteristics and consisting essentially of an adduct of an allyl carbamate having one or both of its amino hydrogen atoms replaced by $C_1$–$C_8$ alcohol etherified methylol groups, said allyl carbamate having the formula:

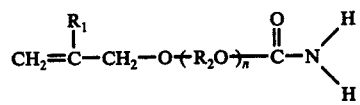

in which $R_1$ is hydrogen or methyl, $R_2$ is an alkylidene group containing from 2–4 carbon atoms, and $n$ is an integer from 0–10.

2. An emulsion as recited in claim 1 in which said vinyl ester is vinyl acetate.

3. An aqueous emulsion comprising an aqueous medium having colloidally suspended therein by means of a surfactant an aqueous emulsion copolymer of at least 90% of the copolymer of vinyl acetate, from 0.5–7% of the copolymer of a $C_1$–$C_8$ alcohol ether of mono-N-methylol allyl carbamate, and any balance of the copolymer consisting essentially of allyl carbamate, di-N-methylol allyl carbamate, and copolymerizable monoethylenic monomers selected from monoethylenic amide, monoethylenic alcohol, and from 0.5–3% of a monoethylenic carboxylic acid.

4. An emulsion as recited in claim 3 in which said monomers providing thermosetting characteristics include a monoethylenic unsaturated amide selected from acrylamide or methacrylamide.

5. An emulsion as recited in claim 3 in which said copolymer further includes from 0.5–3% of monoethylenic carboxylic acid.

6. An emulsion as recited in claim 3 in which said monomers providing thermosetting characteristics are present in an amount of from 2–10%.

7. An emulsion as recited in claim 3 in which a $C_1$–$C_4$ alcohol ether is employed.

* * * * *

UNITED STATES PATENT AND TRADEMARK OFFICE
CERTIFICATE OF CORRECTION

PATENT NO. : 4,110,289
DATED : August 29, 1978
INVENTOR(S) : Martin K. Lindemann It is certified that error appears in the above—identified patent and that said Letters Patent is hereby corrected as shown below:

The term of this patent subsequent to March 2, 1993 has been disclaimed.

Signed and Sealed this

Fourteenth Day of October 1980

[SEAL]

Attest:

SIDNEY A. DIAMOND

Attesting Officer

Commissioner of Patents and Trademarks